A. E. GUY.
INDICATING TORQUE METER.
APPLICATION FILED AUG. 12, 1912.
1,061,372.
Patented May 13, 1913.
2 SHEETS—SHEET 1.
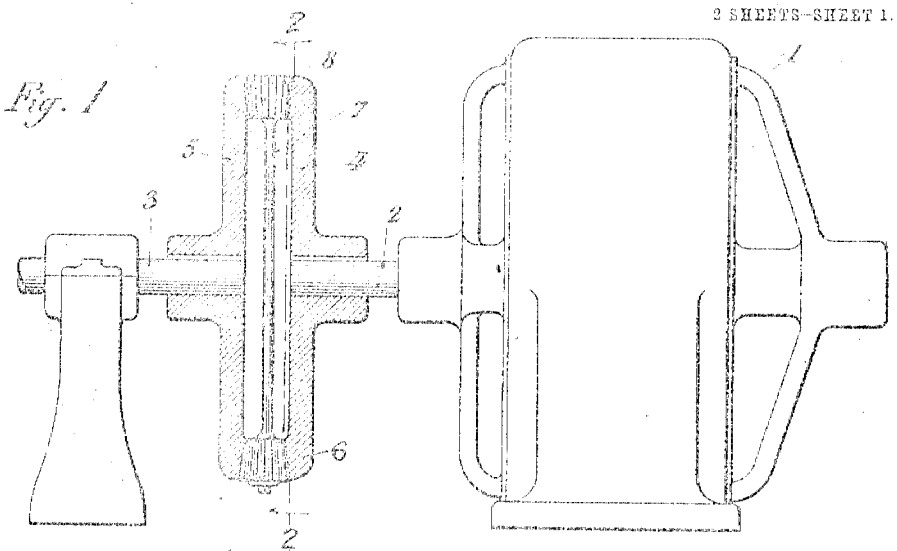
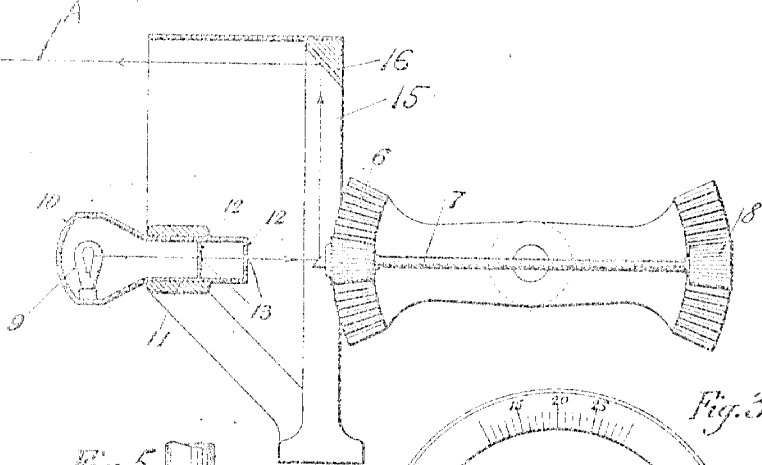
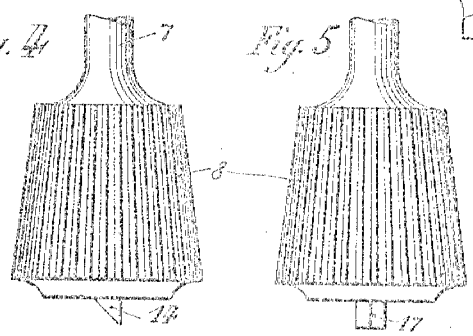
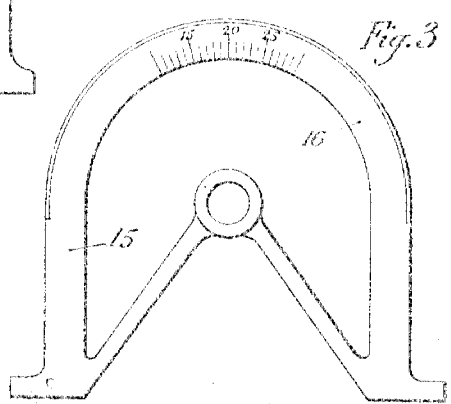
Witnesses.
Inventor.
Albert E. Guy
by Fred'k F. Hunter
Attorney.

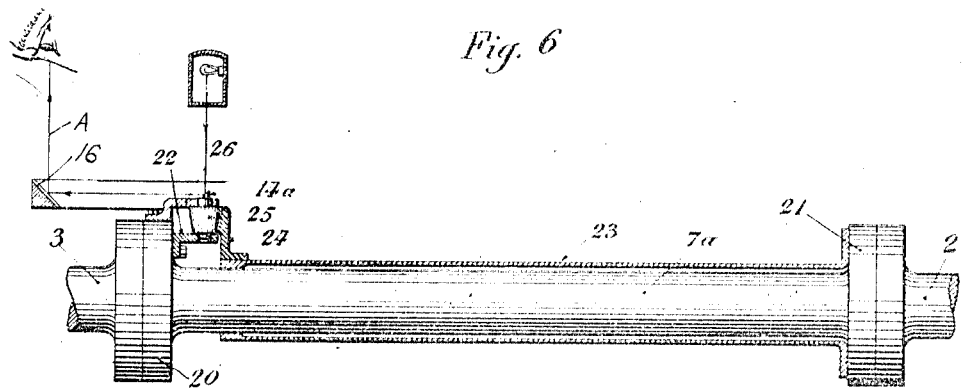
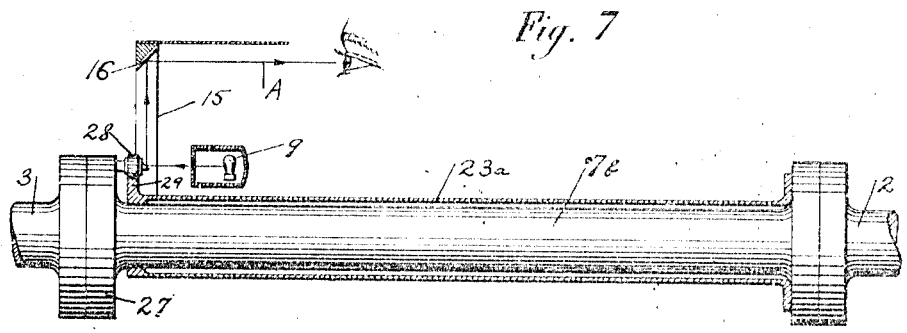
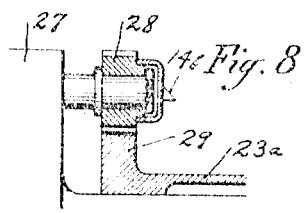

UNITED STATES PATENT OFFICE.

ALBERT E. GUY, OF PITTSBURGH, PENNSYLVANIA.

INDICATING TORQUE-METER.

1,061,372.

Specification of Letters Patent.   Patented May 13, 1913.

Application filed August 12, 1912.   Serial No. 714,676.

*To all whom it may concern:*

Be it known that I, ALBERT E. GUY, a resident of Pittsburgh, in the county of Allegheny and State of Pennsylvania, have invented a new and useful Improvement in Indicating Torque-Meters, of which the following is a specification.

This invention relates to apparatus for determining and indicating the torque transmitted by rotation from a driving member to a driven member, and particularly to that class of devices known as indicating torque meters.

The objects of the invention are to provide simple and improved apparatus for measuring the torque transmitted, in which the torque can be instantaneously read at any time, and which can be readily adapted to members which rotate at widely varying speeds.

The invention comprises the construction and arrangement of parts hereinafter described and claimed.

In the drawings Figure 1 represents an elevation of the connection between the driving and driven members in a system arranged according to my invention, parts being omitted; Fig. 2 is a cross section of the same on the line 2—2, Fig. 1, and showing the indicating means; Fig. 3 is an elevation of the indicating scale and its supporting frame, as viewed from the left in Fig. 2; Fig. 4 is an enlarged detail view of one end of a shaft, viewed from the right in Fig. 1; Fig. 5 is a similar view showing the same parts viewed from the left in Fig. 4; Fig. 6 is a view, corresponding to Fig. 1, of a modified form of the invention; Fig. 7 is a similar view of another modification; and Fig. 8 is a detail view of the device shown in Fig. 7.

According to my invention, I insert between the driving and driven members a shaft or rod, a definite length of which is subjected, during rotation of the parts, to torsion and, according to the amount of power transmitted, is twisted more or less. The twisted shaft or rod is preferably disposed with its axis transverse to the axis of rotation, but in some cases may be parallel or at an angle thereto, and means are provided for measuring and indicating to the observer the amount of twist given to the shaft during rotation of the parts. Preferably, an optical method of observation is employed, since this affords the most accurate means of observation with the least complications in the apparatus.

In Figs. 1 to 5 of the drawings, the apparatus is arranged for enabling the torque transmitted by a motor 1, which may be of any type or description, through a driving shaft 2 to a driven shaft 3, to be indicated and observed. The driving and driven shaft members 2 and 3 are disposed end to end, and in alinement with each other, and with their ends slightly spaced apart. Fixedly mounted upon the ends of the shaft members are a pair of coupling members, which may be formed as complete bevel gears, but are shown as comprising transversely disposed parallel members 4, 5, having gear segments 6 at their opposite ends. Between the coupling members 4, 5 is mounted a shaft or rod 7, which is preferably formed of material of homogeneous composition and structure, and provided on both of its ends with bevel gear members 8, having teeth accurately cut or ground to mesh with the teeth on the gear segments 6, these bevel gears 8 being either integral with or very rigidly secured to the shaft or rod 7. Preferably, the two coupling members 4 and 5 are so adjusted and spaced from each other that there will be no lost motion or play of the gears 8 between their mating gear segments 6. In other words, the pitch lines of the gear segments 6 and of the gears 8 must exactly coincide with each other.

In operation the driving shaft 2 is rotated by the motor 1 and in turn rotates the coupling member 4. The gear segment 6 on the member 4 tends to rotate the shaft 7 in one direction while the gear segment at the other end of said member tends to rotate it in the other direction. The shaft is loosely held in place between the coupling members 4 and 5 and transmits the motion of one to the other. In the embodiment shown in Fig. 1 the shaft 7 and gears 8 float, as it were, between the two coupling members 4 and 5, no positive means being shown for holding or supporting the rod or shaft and the gear members in position, although, however, such means of a type suitable to the particular machine may be provided if desired. The rotation of member 2 by the motor 1, thus places the rod or shaft 7 under torsion and twists that portion between the two gear members 8. The amount of twist or torsion placed in the shaft 7 will depend upon the amount of torque transmitted from the shaft or member 2 to the member 3.

It will, of course, be understood that both the members 4 and 5 rotate with the shaft members 2 and 3 and carry the gears 8 and rod or shaft 7 around the axis of rotation. Although I prefer to use the construction described, it is not essential that both members 4 and 5 be provided with gear segments thereon.

So far as described to this point, the shaft or rod 7 constitutes a torque meter, in that its condition, or the amount of twist therein, always corresponds to the amount of torque in the shaft members 2 and 3.

Suitable means is provided for instantaneously indicating at all times the torque or twist in the shaft 7. The apparatus is particularly designed for use where power is transmitted at high speeds; for example, where the shaft members revolve at several thousand revolutions per minute. From the above, it will be observed that each end of the rod or shaft 7, where it is visible between the coupling members 4 and 5 passes a given point once at each revolution of the shaft members. At one side of the axis of rotation and horizontally in the same plane therewith, is mounted upon any suitable support a lamp or other illuminator 9, surrounded by a cover or shield 10 and provided with a suitable projector 11 comprising a tube having a pair of parallel walls 12 therein provided with small alined apertures 13, the whole being so disposed and arranged as to cast a single beam of light rays horizontally and in the plane of rotation of the rod or shaft 7. A suitable lens or lenses may also be placed in the projector to concentrate the rays in the usual manner, if desired. Upon one end of the rod or shaft 7 is held a small mirror or reflector 14 having its surface inclined at an angle to the line of the beam of light cast by the illuminator 9. This mirror or reflector may be a separate part secured to the shaft, or it may be formed by merely cutting or carving and polishing the material of the shaft itself, as preferred. A suitable frame 15 is also mounted at the same side of the axis of rotation as the illuminator 9. The upper portion of this frame is semi-circular and carries a conical mirror or reflector 16, the surface of which is concentric with the beam of light cast by the illuminator 9, the angle of inclination of any particular element of the conical surface of mirror or reflector 16 being such as to reflect any light rays coming from the reflector 14, in a line parallel to the axis of the projector but in the reverse direction. Preferably, also a very thin, fine scratch, mark, or line 17 is formed upon the central portion of the mirror 14, as shown in Fig. 5.

The apparatus described is used as follows: The mirror or reflector 14 is so placed or formed upon the end of the rod or shaft 7 that when the axis of the rod or shaft is horizontal and in line with the beam of light cast by the illuminator 9, this beam will illuminate the mirror or reflector, which therefore is visible in the mirror 16 by an observer looking thereinto in the direction of the line of sight A. The mirror 16 is graduated, as shown in Fig. 3, and with any preferred system of units. The mark or scratch 17 will appear in the line of sight A as a very thin, dark mark upon a light background. The mirror 14 and scale 16 are preferably so placed that, with the apparatus at rest, the indicating mark will be seen in line with or pointing to the zero mark of the scale. Assuming the illuminator 9 to be lighted and the motor 1 to be started, the driving member 2 transmits power through the couplers 4 and 5 and to the driven member 3, twisting the rod or shaft 7, as stated. Thus the mirror or reflector 14 is rotated to a given extent about the axis of the rod or shaft 7, the amount of this rotation depending upon the amount of twist in the shaft 7 and therefore, upon the torque transmitted. The shaft members 2 and 3 rotate at very high speed and at each complete rotation thereof the mirror or reflector 14, which is carried bodily by shaft 7 around the axis of members 2 and 3, passes the beam of light cast by the illuminator 9 and is illuminated thereby, so that it appears visible in mirror 16. Each time the mirror or reflector 14 passes, a distinct impression or image of the indicating mark 17 is, therefore, seen upon the scale and the rapid succession of impressions of the mark 17 upon the retina of the eye gives the appearance of a maintained mark or pointer. The scale is, of course, calibrated and may be made to read in any desired units. Preferably, however, the numbers upon the scale will be calculated to include certain constants so that, to obtain the actual power transmitted, it will only be necessary to observe the rate of rotation of the shaft members 2 and 3 simultaneously with the observation of the torque in the rod or shaft 7, as described. This factor in the problem may be obtained in any suitable manner and by any means and applied to complete the calculations.

I wish it to be distinctly understood that my invention is not limited to the particular means shown for indicating the amount of torque transmitted by couplings 4 and 5. In Fig. 6, a modified arrangement of parts is shown, comprising a rod or shaft $7^a$ placed axially in line with and rigidly connected to both the driving and driven members 2 and 3. At its opposite end, the rod or shaft $7^a$ is provided with flanges 20 and 21. To the first flange 20 are bolted or otherwise rigidly secured bearing members 22 and 26. Around the shaft $7^a$ is placed a rigid sleeve 23, which may be formed in two semi-cylindrical portions bolted or otherwise secured together, and which is rigidly fastened at one end to the flange 21. At its other end, the sleeve 23 loosely surrounds the shaft $7^a$ and carries rigidly secured thereto a gear segment 24. In the bearing members 22 and 26 is rotatably mounted a beveled gear member 25, having on one end thereof and in line with its axis a mirror or reflector $14^a$.

This apparatus is used in exactly the same way as that above described. Rotation of the driving member 2 rotates the driven member 3 and produces twist or torsion in the shaft or rod $7^a$ connecting the two members. The sleeve 23 is rigidly connected only to one end of the shaft or rod $7^a$ and is, therefore, not subjected to torsion by rotation of the rotating members. There is, therefore, relative rotation between the gear segment 24 and bearing members 22 and 26 which produces rotation of the gear member 25 on its own axis and rotation of the mirror $14^a$ around the axis of the gear 25 and corresponding to the twist in the shaft $7^a$, the mirror being also carried bodily around the axis of rotation of members 2 and 3, as before. The amount of torsion or twist in the shaft $7^a$ may be read with a mirror scale 16 in which the image of the indicating mark is seen in the same manner as with the other form described.

Figs. 7 and 8 represent another form of the invention in which a flange 27 carried rigidly by one end of the shaft or rod $7^b$ supports a gear member 28 with its axis of rotation parallel to that of rotation of the members 2 and 3. A sleeve $23^a$ supported rigidly at one end upon the rod or shaft $7^a$ is provided at its other end with a gear segment 29, the teeth of which mesh with the teeth of the gear 28. On a cap on the end of the gear 28 and in line with its axis is mounted a mirror $14^b$ having its surface at an angle to the axis of the gear. This apparatus is similar to those above described, except for the fact that the axis about which the mirror rotates is parallel instead of at an angle to the axis of rotation of members 2 and 3. Consequently, the mirror frame 15 and conical mirror 16 must be supported in a different position and as shown. The illuminator 9 is arranged to cast a beam in a line parallel to the axis of rotation of members 2 and 3 and into the path of movement of the mirror $14^b$ which, each time it passes the beam, is illuminated, thereby causing an image of the indicating mark 17 to be seen in mirror 16, as before.

What I claim is:—

1. Apparatus for determining and indicating the torque transmitted by a driving to a driven member, comprising a member adapted to connect said driving and driven members and to be twisted thereby, and a reflector on said connecting member and arranged to be carried bodily around the axis of rotation of said members and to be rotated in accordance with the amount of twist therein.

2. Apparatus for determining and indicating the torque transmitted by a driving to a driven member, comprising a member adapted to connect said driving and driven members and to be twisted thereby, a reflector on said connecting member and arranged to be carried bodily around the axis of rotation of said members and to be rotated in accordance with the amount of twist therein, and an illuminator arranged to cast light rays into the path of movement of said reflector around the axis of rotation.

3. Apparatus for determining and indicating the torque transmitted by a driving to a driven member, comprising a member adapted to connect said driving and driven members and to be twisted thereby, a reflector connected to said connecting member and arranged to be carried bodily around the axis of rotation of said members and to be rotated in accordance with the amount of twist therein, a projector arranged to illuminate said reflector as it travels around the axis of rotation, said reflector being provided with an indicating mark, and a reflecting scale in which is seen an image of said indicating mark.

4. Apparatus for determining and indicating the torque transmitted by a driving to a driven member, comprising a member arranged to connect said members and to be twisted during rotation thereof, and means for indicating the amount of twist in said member, comprising a reflector connected to be moved in accordance with the amount of twist in said member and provided with an indicating mark, and means for illuminating said reflector to render said indicating mark visible.

5. Apparatus for determining and indicating the torque transmitted by a driving to a driven member, comprising a shaft connecting said members and arranged to be twisted during rotation thereof, and a reflector rigidly connected to said shaft and arranged to be moved in accordance with the amount of twist therein.

6. Apparatus for determining and indicating the torque transmitted by a driving to a driven member, comprising a shaft connecting said members and arranged to be twisted during rotation thereof, a reflector connected to said shaft and provided with an indicating mark and arranged to be moved in accordance with the amount of twist in said shaft, and an indicating scale upon which said reflector casts an image of said indicating mark.

7. Apparatus for determining and indicating the torque transmitted by a driving to a driven member, comprising a shaft connecting said members, a reflector rigidly mounted on said shaft and having an indicating mark and arranged to be moved in accordance with the amount of twist in said shaft, and a projector arranged to illuminate said reflector to render said indicating mark visible.

8. Apparatus for determining and indicating the torque transmitted by a driving to a driven member, comprising a shaft connecting said members, a reflector on said shaft and arranged to be moved in accordance with the amount of twist in said shaft, a projector arranged to cast a beam of light into the path of movement of said reflector, and an indicating scale arranged to receive the light rays reflected by said reflector.

9. Apparatus for determining and indicating the torque transmitted by a driving to a driven member, comprising a shaft connecting said members, a reflector on said shaft and provided with an indicating mark and arranged to be moved in accordance with the amount of twist in said shaft, a projector arranged to cast a beam of light into the path of movement of said reflector, and an indicating scale upon which said reflector casts an image of said indicating mark.

10. Apparatus for determining and indicating the torque transmitted by a driving to a driven member, comprising coupling members on said driving and driven members, a transversely disposed shaft between said coupling members and connected and arranged to be twisted thereby, and a reflector carried by one end of said shaft and arranged to be moved in accordance with the amount of twist in said transverse shaft.

11. Apparatus for determining and indicating the torque transmitted by a driving to a driven member, comprising coupling members on said driving and driven members, a transversely disposed shaft between said coupling members and connected and arranged to be twisted thereby, a reflector carried by one end of said shaft and arranged to be moved in accordance with the amount of twist in said transverse shaft, and a projector arranged to cast a beam of light into the path of movement of said reflector.

12. Apparatus for determining and indicating the torque transmitted by a driving to a driven member, comprising coupling members on said driving and driven members, one thereof being provided with gear teeth, a transversely disposed shaft between said coupling members and provided at its ends with gear teeth to mesh with the teeth of said coupling member and to be twisted thereby, a reflector carried by one end of said shaft and arranged to be moved in accordance with the amount of twist therein, a projector arranged to cast a beam of light into the path of movement of said reflector, and an indicating scale upon which the beam of light coming from said projector is reflected by said reflector.

13. Apparatus for determining and indicating the torque transmitted by a driving to a driven member, comprising coupling members on said driving and driven members, a transversely disposed shaft between said coupling members and connected and arranged to be twisted thereby, a reflector carried by one end of said shaft and arranged to be moved in accordance with the amount of twist in said transverse shaft, a projector arranged to cast a beam of light into the path of movement of said reflector, and a conical reflecting scale arranged to receive the beam of light reflected by said reflector.

14. Apparatus for determining and indicating the torque transmitted by a driving to a driven member comprising, coupling members on said driving and driven members and provided with gear teeth, a transversely disposed shaft between said coupling members and provided at its ends with gear teeth to mesh with the teeth of said coupling members, a reflector carried by one end of said shaft and arranged to be moved in accordance with the amount of twist in said transverse shaft, a projector arranged to cast a beam of light into the path of movement of said reflector, and a conical reflecting scale arranged to receive the beam of light reflected by said reflector and provided with graduated indicating marks.

In testimony whereof, I have hereunto set my hand.

ALBERT E. GUY.

Witnesses:
ELBERT L. HYDE,
MARY E. CAHOON.